United States Patent
Pelletier et al.

(10) Patent No.: US 11,748,979 B2
(45) Date of Patent: Sep. 5, 2023

(54) METHOD FOR TRAINING A NEURAL NETWORK FOR RECOGNITION OF A CHARACTER SEQUENCE AND ASSOCIATED RECOGNITION METHOD

(71) Applicant: BULL SAS, Les Clayes sous Bois (FR)

(72) Inventors: Benoit Pelletier, Saint Etienne de Crossey (FR); Mathieu Ospici, Grenoble (FR); Marc Platini, Grenoble (FR)

(73) Assignee: BULL SAS, Les Clayes sous Bois (FR)

( * ) Notice: Subject to any disclaimer, the term of this patent is extended or adjusted under 35 U.S.C. 154(b) by 1104 days.

(21) Appl. No.: 16/235,642

(22) Filed: Dec. 28, 2018

(65) Prior Publication Data
US 2019/0205752 A1 Jul. 4, 2019

(30) Foreign Application Priority Data
Dec. 29, 2017 (FR) .................................... 17 63422

(51) Int. Cl.
*G06V 10/82* (2022.01)
*G06V 20/62* (2022.01)
(Continued)

(52) U.S. Cl.
CPC .............. *G06V 10/82* (2022.01); *G06F 16/51* (2019.01); *G06F 18/00* (2023.01); *G06F 18/214* (2023.01);
(Continued)

(58) Field of Classification Search
CPC .......... G06N 3/08; G06N 3/0472; G06N 3/04; G06F 16/51; G06K 9/62; G06K 9/6256; G06V 20/63; G06V 30/10; G06V 20/625
See application file for complete search history.

(56) References Cited

U.S. PATENT DOCUMENTS 9,785,855 B2 10/2017 Gordo Soldevila et al.
11,176,443 B1 * 11/2021 Selva .................... G06K 9/6267
(Continued)

FOREIGN PATENT DOCUMENTS

EP 3182334 A1 6/2017
GB 0841623 A2 * 5/1998
(Continued)

OTHER PUBLICATIONS

Liu et al. "An Implementation of No. Plate Recognition without Segmentation using Convolutional Neural Network", IEEE ICHPCC, 2017, pp. 246-253.*

(Continued)

*Primary Examiner* — Li Wu Chang
(74) *Attorney, Agent, or Firm* — MEAGHER EMANUEL LAKS GOLDBERG & LIAO, LLP (57) ABSTRACT

Disclosed is a method for training a neural network, for the recognition of a sequence of characters in an image and without a predefined format, including: a step of creating an artificial database of a plurality of sequences of characters in images, some sequences being generated randomly, other sequences being derived from transformations of sequences generated randomly; a learning step that teaches the neural network to recognize a sequence of characters in an image, directly on at least some of the sequences of the artificial database, without a preliminary subdividing of these sequences into their component characters.

24 Claims, 3 Drawing Sheets

(51) Int. Cl.
G06F 18/00 (2023.01)
G06F 18/214 (2023.01)
G06N 3/047 (2023.01)
G06V 10/70 (2022.01)
G06F 16/51 (2019.01)
G06N 3/08 (2023.01)
G06V 30/10 (2022.01)

(52) U.S. Cl.
CPC ............. *G06N 3/047* (2023.01); *G06N 3/08* (2013.01); *G06V 10/70* (2022.01); *G06V 20/63* (2022.01); *G06V 20/625* (2022.01); *G06V 30/10* (2022.01)

(56) References Cited

U.S. PATENT DOCUMENTS

| | | | | |
|---|---|---|---|---|
| 2012/0148105 | A1* | 6/2012 | Burry | G06V 10/987 382/105 |
| 2015/0347859 | A1 | 12/2015 | Dixon et al. | |
| 2015/0347860 | A1* | 12/2015 | Meier | G06V 20/63 382/140 |
| 2016/0350655 | A1* | 12/2016 | Weiss | G06F 40/35 |
| 2018/0349788 | A1* | 12/2018 | Sarkar | G06N 3/08 |
| 2019/0180154 | A1* | 6/2019 | Orlov | G06V 10/768 |

FOREIGN PATENT DOCUMENTS

| | | | | |
|---|---|---|---|---|
| JP | 2013038540 | * | 2/2013 | |
| WO | WO-2017091763 A1 | * | 6/2017 | .......... G06N 3/0445 |

OTHER PUBLICATIONS

Cheang et al. "Segmentation-free Vehicle License Plate Recognition using ConvNet-RNN", 2017, pp. 5, https://arxiv.org/abs/1701.06439.*

Bala et al., "Image simulation for automatic license plate recognition", Proceedings of SPIE, 2012, vol. 8305, 2012, doi: 10.1117/12.912453.

French Search Report, dated Sep. 18, 2018, from corresponding FR application No. 1763422.

* cited by examiner

| Images | Output |
|---|---|
| 41 | OOOKY |
| 42 ROBI68 | ROBI68 |
| 43 POT 8 | POT8 |
| 44 N40IYRX | N40IYRX |
| 45 E507NUL | E507NLL |
| 46 | BKI |
| 47 | BJ02BUS |

FIG. 5

METHOD FOR TRAINING A NEURAL NETWORK FOR RECOGNITION OF A CHARACTER SEQUENCE AND ASSOCIATED RECOGNITION METHOD

FIELD OF THE INVENTION

The invention relates to the field of methods for training a neural network for the recognition of a character sequence, as well as the field of methods for recognizing a character sequence which are then associated with said methods.

BACKGROUND OF THE INVENTION

The invention concerns the recognition of a character sequence in an image in order to locate and extract it in a manner that is both simple and effective.

According to a first prior art, it is known to carry out deep learning during which a character sequence of predetermined fixed format that is known beforehand is extracted from an image having a plain background that is also fixed and known beforehand, by performing digital segmentation which takes advantage of the fixed and known sequence format in the image.

Although this first prior art allows using a relatively small database of actual sequences for learning while enabling satisfactory subsequent recognition, it nevertheless has two disadvantages.

First, the method only works with a character sequence of predetermined fixed format that is known beforehand. Next, the method also requires predetermined conditions in the background of the image from which the character sequence must be extracted. To summarize, this first relatively simple prior art has no flexibility. If flexibility is needed, it becomes necessary to expand the methods used and their coordination becomes very complex, without any guarantee concerning the final result obtained.

According to a second prior art, it is known to carry out deep learning during which only a very small sequence of numbers is extracted from an image, without performing a digital segmentation requiring a fixed sequence format in the image that is known beforehand.

A first disadvantage of this second prior art is that it requires a database of actual data that is very large, containing about a million different actual sequences, in order to achieve training that results in satisfactory subsequent recognition. A second disadvantage of this second prior art is that it is limited to numbers and does not also include letters.

SUMMARY OF THE INVENTION

The object of the present invention is to provide a method for training a neural network for the recognition of a character sequence which at least partially overcomes the above disadvantages.

More particularly, the invention aims to provide a method for training a neural network for the recognition of a character sequence in an image and without a predefined format, such that not only does the method for recognizing a character sequence in an image based on this method for training a neural network remain robust regardless of the type of character sequence to be recognized and regardless of the type of image in which the character sequence is included, but it does so in such a way that this robustness is obtained in spite of a generally greatly insufficient number of actual character sequences for constructing a database of sufficient size for the neural network learning step to then guarantee a recognition method that would be robust.

In the proposed invention, it is the combination of the particular structure of the artificial database of character sequences and the particular execution of the learning step by the neural network using this artificial database of character sequences which makes it possible to obtain this surprising improvement in the robustness of the method for recognizing actual sequences.

To this end, the present invention proposes a method for training a neural network, for the recognition of a character sequence in an image and without a predefined format, comprising: a step of creating an artificial database of a plurality of character sequences in images, some sequences being generated randomly, other sequences being derived from transformations of sequences generated randomly; a learning step that teaches the neural network to recognize a character sequence in an image, directly on at least some of said sequences of said artificial database, without a preliminary subdividing of these sequences into their component characters.

To this end, the present invention also provides a method for recognizing a character sequence in an image, comprising: a step of recognizing a character sequence in an image, by means of a neural network trained by a training method according to the invention.

According to some embodiments of the invention, as the robustness improves, some or all of the advantages among the following advantages can be obtained: identification of a character sequence in an image with performances comparable to those of a human being; identification of a character sequence in an image with typographic characters that are not at all standardized, having variations in terms of size, font, color, orientation, brightness, blur, noise; identification of a character sequence in an image enabling real-time processing of a video stream exceeding 24 fps (frames per second); identification of a character sequence in an image, from a very small set of available actual character sequences.

According to some embodiments of the invention, the functionalities of a TensorFlow type of software library have been used to train and test the neural network.

According to some embodiments of the invention, the deep neural network trained by the invention must recognize a sequence of letters and numbers in an image, and/or of variable size but limited to 8 characters maximum, and/or with a highly variable image background both in terms of texture and size, and/or enable recognition of registration plates of land-based motor vehicles, for example cars, trucks and motorcycles, and/or from a very small available set of actual character sequences, for example about a thousand sequences only.

In preferred embodiments, the invention comprises one or more of the following features which can be used separately or in combinations of some or all of them, with one or the other of the above objects of the invention.

Preferably, the neural network is a deep neural network, preferably comprising at least four layers of neurons, more preferably comprising between five and ten layers of neurons, even more preferably comprising seven layers of neurons.

Thus, the method for recognizing a character sequence in an image based on this method for training a neural network remains particularly robust.

Preferably, the deep neural network is a convolutional deep neural network, preferably comprising convolutions of a size comprised between three and ten.

The method for recognizing a character sequence in an image based on this method for training a neural network thus remains particularly robust.

Preferably, in the step of creating the artificial database of a plurality of character sequences in images, at least 60% of these sequences are either randomly generated sequences or are derived from transformations of randomly generated sequences, preferably at least 90% of these sequences are either randomly generated sequences or are derived from transformations of randomly generated sequences, even more preferably at least 99% of these sequences are either randomly generated sequences or are derived from transformations of randomly generated sequence, advantageously 100% of these sequences are either randomly generated sequences or are derived from transformations of randomly generated sequences.

The method for recognizing a character sequence in an image based on this method for training a neural network thus remains robust regardless of the type of character sequence to be recognized and regardless of the type of image in which this character sequence is included, if not in spite of the total absence of actual character sequences, at least in spite of the presence of a number of actual character sequences that is usually much too small for the neural network learning step.

Preferably, the learning step that teaches the neural network to recognize a character sequence in an image is carried out directly, without prior subdividing, for at least 60% of said sequences of said artificial database, preferably for at least 90% of said sequences of said artificial database, even more preferably for at least 99% of said sequences of said artificial database, advantageously for 100% of said sequences of said artificial database.

The method for recognizing a character sequence in an image based on this method for training a neural network thus remains even more robust regardless of the type of character sequence to be recognized and regardless of the type of image in which this character sequence is included.

Preferably, said transformations are: the insertion of spaces of variable size between the characters of certain sequences of the artificial database, and/or the use of different types of backgrounds of different sizes as backdrops for the character sequences to be recognized.

The method for recognizing a character sequence in an image based on this method for training a neural network thus remains even more robust regardless of the type of character sequence to be recognized and regardless of the type of image in which this character sequence is included.

A learning database comprising only sequences of characters that are uniformly spaced apart from one another will make the recognition method considerably more fragile once randomly spaced characters from actual sequences to be recognized are encountered; such is the case with registration plates, which are of varying sizes and may have different spacing widths depending on their position on the registration plate.

Because the character sequences to be recognized are extracted from the images in which they are located along with their background, the size and visual texture of this background are also parameters that are more critical than others.

Preferably, said transformations are: geometric transformations that may include: enlargements, and/or reductions, and/or rotations, and/or translations, and/or geometric distortions, and/or other geometric deformations; and/or image processing transformations that may include: color changes, and/or changes in grayscale, and/or edge enhancements, and/or edge smoothing, and/or other intensity and/or contrast processing.

The method for recognizing a character sequence in an image based on this method for training a neural network thus remains even more robust regardless of the type of character sequence to be recognized and regardless of the type of image in which this character sequence is included, and also regardless of the conditions in which these actual character sequences are photographed or otherwise obtained.

Preferably, the artificial database of sequences comprises at least 100,000 different sequences for learning, preferably at least 500,000 different sequences for learning, even more preferably between 500,000 and 2,000,000 different sequences for learning.

The method for recognizing a character sequence in an image based on this method for training a neural network will thus be more robust when a large database is used for its learning.

In particular, the fact that the neural network is deep means that a larger database must be used for its learning.

The benefit obtained by this deep neural network, more demanding in terms of the size of the artificial learning database, is greater robustness during the subsequent recognition process.

Preferably, the artificial database of sequences comprises between one-third and two-thirds randomly generated sequences, and between two-thirds and one-third sequences derived from transformations of randomly generated sequences, preferably as many randomly generated sequences as there are sequences derived from transformations of randomly generated sequences.

Thus, the neural network learning database creates a good compromise between teaching the type of character to be recognized in the sequence and the form in which the character will be found in the sequence to be recognized.

Preferably, some or all of the sequences contained in the artificial database and obtained by transformations of randomly generated sequences are derived from transformations of randomly generated sequences already contained in the artificial database.

The neural network learning database is thus a bit more efficient, as at least part of the character sequences to be recognized will be found both in standard form and in non-standard form.

Preferably, the artificial database comprises character sequences in which the typographic characters are not standardized, but on the contrary have: a variable size, and/or a variable font, and/or a variable color, and/or a variable orientation, and/or a variable brightness, and/or a variable blur level, and/or a variable signal-to-noise ratio.

The method for recognizing a character sequence in an image based on this method for training a neural network thus remains even more robust regardless of the type of character sequence to be recognized and regardless of the type of image in which this character sequence is included, and also regardless of the conditions in which these actual character sequences are photographed or otherwise obtained.

Preferably, the characters comprise letters and numbers.

The method for recognizing a character sequence in an image based on this method for training a neural network will thus be more robust in the recognition of automobile registration plates.

Preferably, in the step of creating the artificial database of a plurality of character sequences in images, less than 10% of these sequences are actual photographed sequences, preferably less than 1% of these sequences are actual photographed sequences, even more preferably 0% of these sequences are actual photographed sequences.

The method for recognizing a character sequence in an image based on this method for training a neural network thus remains robust regardless of the type of character sequence to be recognized and regardless of the type of image in which this character sequence is included, if not in spite of the total absence of actual character sequences, at least in spite of the presence of a number of actual character sequences that is usually much too small for the neural network learning step.

Preferably, the character sequences of the artificial database respectively correspond to automobile registration plates.

This is a preferred embodiment comprising many practical applications in vehicular road traffic, preferably of land vehicles.

Preferably, the length of the character sequence is comprised between one and nine.

Thus, the ability to determine in advance the length of the character sequence to be recognized and to implement it in the recognition method as well as in the training method makes these methods more efficient, in particular improving their compromise between increasing the detection efficiency and decreasing the false alarm rate.

Preferably, the learning step which teaches the neural network uses, for each character of the character sequence to be recognized, a probability table representative of said character.

This improves the compromise between efficiency during the course of the recognition process and simplicity during the course of the training process, carried out in the learning step.

Preferably, the learning step which teaches the neural network uses a cost function to compare two probability distributions representative of the character sequence to be recognized.

The use of a cost function allows the training to converge more quickly.

Preferably, said cost function is based on cross entropy.

Cross entropy is a cost function that is particularly effective in optimizing these probabilities.

Preferably, the cost function of the character sequence is the sum of the cost functions of each character.

Summation of the cost functions of each character in order to obtain the global cost function of the character sequence offers two advantages: first, it is simple to implement; second, it still works well despite the complexity of the process of recognizing a character sequence of non-standard format.

Preferably, said cost function is minimized by an ADAM optimizer.

The ADAM optimizer minimizes the cost function quickly and efficiently.

Preferably, the loading of data as input to the neural network occurs via an asynchronous queue which contains the files to be loaded and the operations to be performed on these files.

This loading strategy is particularly effective here.

Preferably, the initialization of weights in the neural network is performed by a Xavier initializer.

The Xavier initializer greatly reduces the learning time of the neural network in this training method, for subsequently obtaining a comparable robustness in the recognition method.

Preferably, the recognition step is preceded by a step of extracting the character sequence and the image background adjacent to this character sequence, from the rest of the image, only said character sequence and said image background adjacent to this character sequence, excluding the rest of the image, being provided to the neural network.

This prior extraction step provides two important advantages. It greatly facilitates the progress of the rest of the recognition process, as a lot of secondary information which could have significantly disrupted the process is removed. In addition, it remains relatively easy to implement, because the image background adjacent to the character sequence stands out and is generally quite distinct from the rest of the image which is more blurred and more random.

Preferably, said image background adjacent to said character sequence is a single-color plain background.

This further improves the second advantage of this prior extraction step, because the image background adjacent to the character sequence stands out and is even more clearly distinct from the rest of the image which in contrast is more blurred and more random.

Preferably, said character sequence to be recognized in an image corresponds to an automobile registration plate.

This is a preferred embodiment comprising many practical applications in vehicular road traffic, preferably of land vehicles.

Preferably, said recognition step is carried out in real time on a video stream of images including the character sequences to be recognized, preferably with a video stream greater than 10 fps, more preferably with a video stream greater than 20 fps.

This is a preferred embodiment comprising difficult but practical real-time applications in vehicular road traffic, for example the instant recognition of automobile registration plates in order to immediately display the speed of a vehicle to its driver, on a radar speed sign at the side of the road.

Other features and advantages of the invention will be apparent from reading the following description of a preferred embodiment of the invention, given as an example and with reference to the appended drawings.

DETAILED DESCRIPTION OF THE INVENTION

Figure 1:
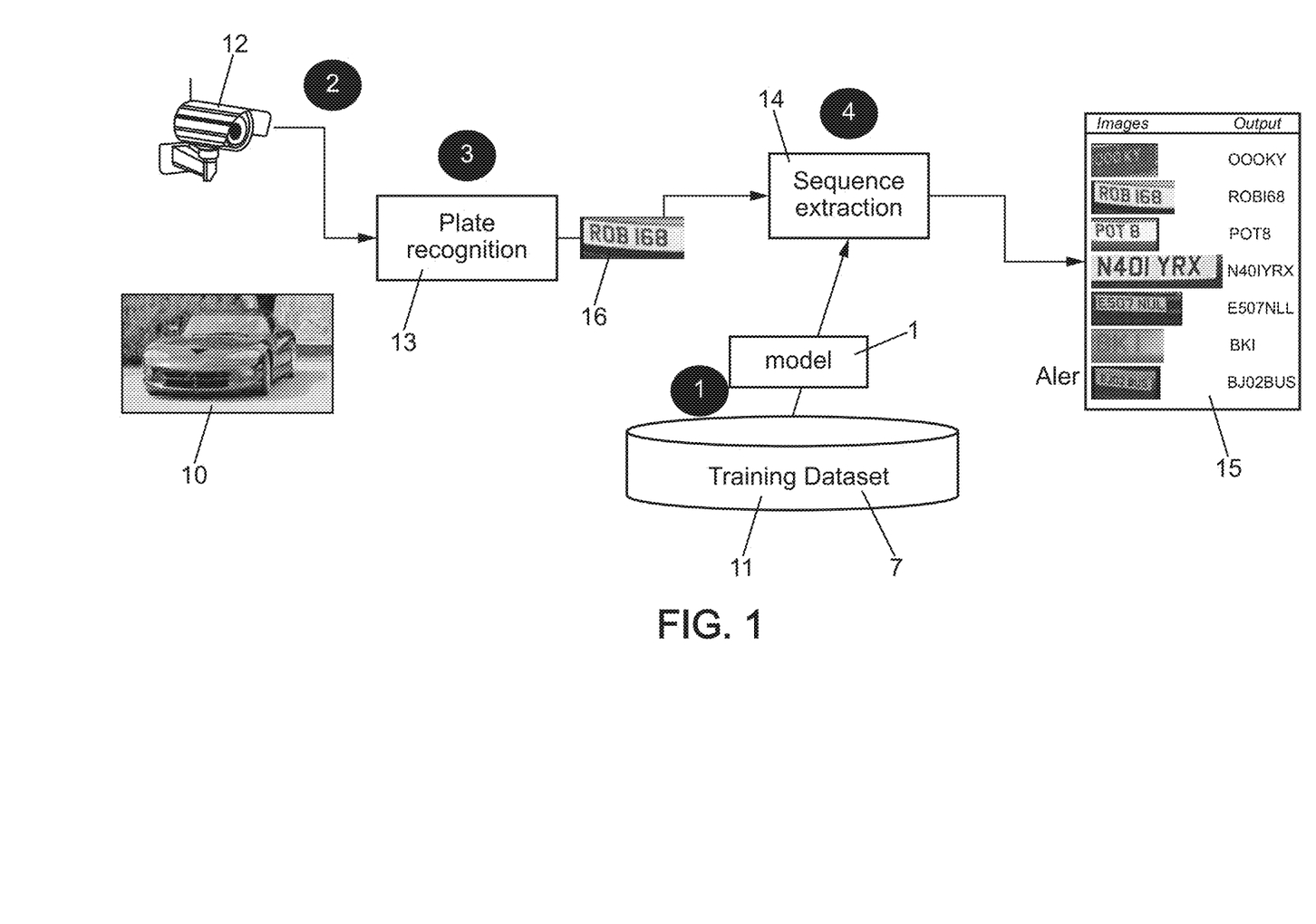
FIG. 1 schematically represents an example execution of a method for recognizing a character sequence based on the method for training a neural network according to one embodiment of the invention.

FIG. 1 schematically represents an example execution of the method for recognizing a character sequence based on the method for training a neural network according to one embodiment of the invention.

During the method for training the neural network 1, using an artificial database 7 of character sequences, a model for the recognition of character sequences in an image, based on a neural network 1, carries out a deep learning step 11.

During the method for recognizing an actual character sequence, a car 10 drives by, and a step 12 of capturing a video is performed, followed by a step 13 of recognizing a registration plate in the captured video image 16, followed by a step 14 of extracting the character sequence contained in the image 16 of the registration plate.

During the step 13 of recognizing an automobile registration plate in the captured video image 16, a system for generating synthesized data carries out the training of the neural network 1 on a sufficient volume of data in the artificial database 7 to achieve the expected recognition performance.

During the step 14 of extracting the character sequence contained in the image 16 of the registration plate, a recognition function locates a portion of the image containing the character sequence, and a deep learning model based on a neural network 1 is used to recognize the character sequence 15, which offers great robustness, allowing the recognition of character sequences of variable brightnesses, from different viewing angles, in varying fonts, etc.

The deep learning model based on a neural network 1 makes it possible to recognize any sequence of N characters, the characters being numbers and/or letters and/or separators such as "-", while remaining compatible with the real-time constraint.

This model of deep learning based on a neural network 1 can also be used to recognize any character sequence in the images, for uses other than for registration plate recognition, provided of course that the initial artificial database for the deep learning of the neural network is provided or created.

Figure 2:
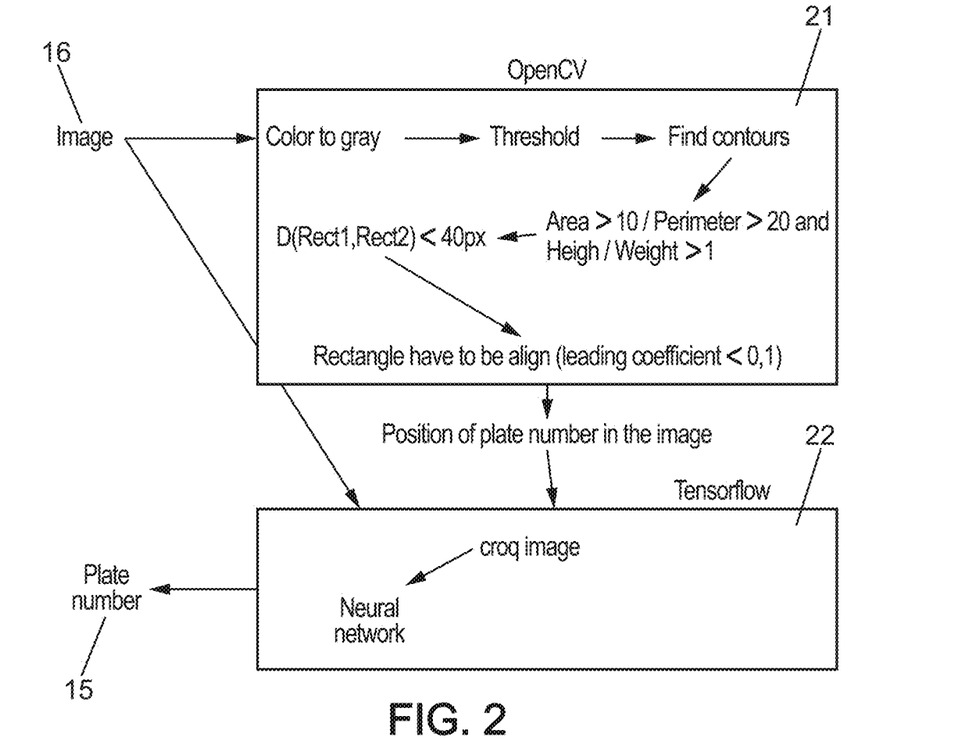
FIG. 2 schematically represents an example printout for the two English-language computer software libraries "OpenCV" and "TensorFlow", in the form of a flowchart for an implementation according to one embodiment of the invention.

FIG. 2 schematically represents an example computer printout for the two English-language computer software libraries "OpenCV" and "TensorFlow", in the form of a flowchart for an implementation according to one embodiment of the invention.

The image 16 will undergo a processing sequence 21 in the OpenCV software library before undergoing another processing sequence in the TensorFlow software library, in order to obtain the character sequence 15 on the registration plate.

Processing sequence 21 successively comprises: color-to-grayscale transformation, thresholding, edge detection, extraction of a rectangular strip giving the position of the registration plate character sequence 15 in the image 16 captured by video.

Processing sequence 22 successively comprises: an extraction of the useful region containing the character sequence 15 to be extracted and the plain background in the immediate vicinity of this character sequence 15 to be extracted, in order to eliminate the rest of the image which can contain much more noise because it is not plain, followed by the recognition step by the neural network 1 which results in obtaining the character sequence contained in the registration plate of the car.

Figure 3:
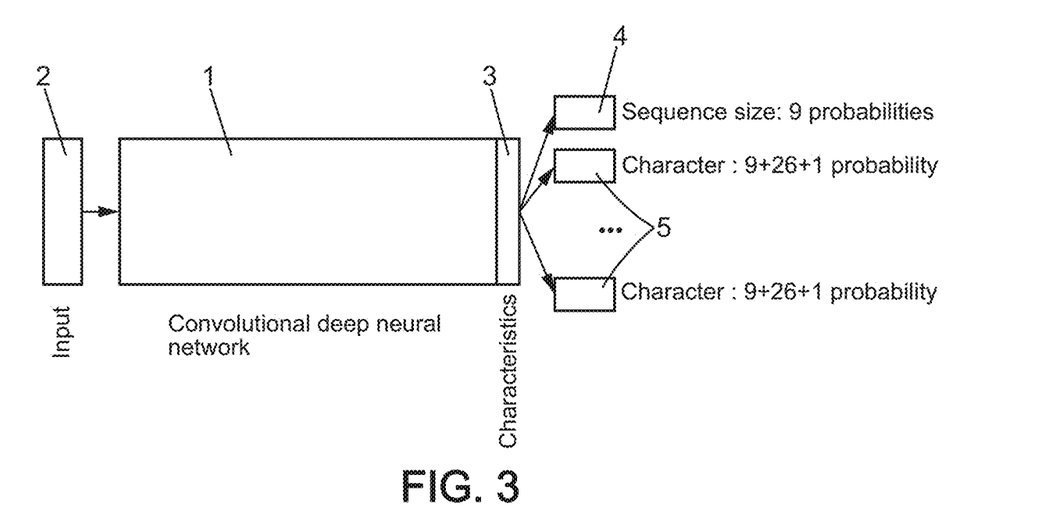
FIG. 3 schematically represents an example operation of the neural network trained according to the method for training a neural network and used according to the method for recognizing a character sequence based on the method for training a neural network according to one embodiment of the invention.

FIG. 3 schematically represents an example operation of the neural network trained according to the method for training a neural network and used according to the method for recognizing a character sequence based on the method for training a neural network according to one embodiment of the invention.

Whether it is for the method for training the neural network 1 or for the method for recognizing a character sequence based on the method for training a neural network 1, the neural network 1 receives an image 2 as input and outputs characteristics 3 which are presented in the form of a probability table. This probability table comprises nine probability values for the size 4 of the sequence and thirty-six probability values for each of the characters 5 of the sequence which may be a digit (nine probability values), a letter (twenty-six probability values), or the separator "-" (one probability value).

The problem of the neural network 1 can be considered as a classification problem. For each character 5 found in the image, it is necessary to determine a value for the probability that it belongs to a class. For each character 5, the number of possible classes is 9+26+1=36, which corresponds to nine digits, twenty-six letters, and a separator "-". For each character 5, there are therefore 36 probability classes.

The neural network 1 will output a probability table ("softmax output") which here, instead of simply indicating to which class an input image belongs, indicates nine probability values in a first table for determining the size 4 of the sequence, then nine subsequent tables each containing 36 probability values for respectively determining which are the nine characters 5.

The neural network 1 uses the cross entropy cost function, which is particularly suitable for comparing the similarities between two probability distributions. It is then a question of minimizing the error between an input image 2 whose character sequence is known and the character sequence prediction that is output by the neural network 1. The neural network 1 outputs ten characteristics which each correspond to a probability distribution, nine for characters and one for the size of the sequence. Thus, ten cross entropies are evaluated, one per output characteristic 3. Ten cost functions are obtained which are simultaneously minimized. The sum of these cost functions gives the global cost function. Since the size 4 of the sequence is at most nine characters 5, cost functions strictly greater than nine are excluded. Alternatively, one can evaluate only nine cross entropies, those of the characters, and not integrate the one for the size 4 of the sequence in the evaluation of cross entropies.

An image is input 2 to the neural network 1, which is transmitted through the layers of the neural network 1, for example seven layers in number, and yields as output characteristics 3 the tables of probability values which then enable extracting the desired character sequence.

The topology of the neural network 1 was determined with the "TensorFlow" software library, and the neural network 1 then carried out its learning step also using this "TensorFlow" software library.

The "TensorFlow" software library performs mathematical operations on tensors, which are multidimensional arrays.

The strategy for loading datasets is based on asynchronous queues. A queue is created that contains the files to be loaded and the operations to be performed on these files, such as reading, decoding, resizing, extraction, etc.

Data augmentation, such as random crop, random flip, random contrast, is also carried out at this time in order to add the data augmentation operations to the queue.

The queues are filled with the data, and asynchronously, the neural network 1 can receive these processed data as input.

A python list (python is a registered trademark) is created for all jpeg images of the available dataset. Simultaneously, another python list (python is a registered trademark) containing the labels is created. For each element x, we have the path of the image and the label of this image. The queue is created with the image paths and labels. The required operations are added to the queue for providing a batch that can be used by the neural network 1.

To carry out the neural network 1 learning, first of all a weight initialization operation is performed. The better the weight initialization strategy, the more time is saved in the neural network 1 learning. A Xavier initializer is used because the results obtained are significantly better than with a conventional randomizer Next, an optimization operation is performed, using a cost function that is minimized by an ADAM optimizer which also gives good results.

Two python scripts (python is a registered trademark) are used, one for the neural network 1 learning, and the other for testing the neural network 1. To share data between scripts, checkpoints are created which contain the numeric values of a list of tensors. All the weights of the neural network 1 are stored at checkpoints during the neural network 1 learning. It is then sufficient to load one of these checkpoints in order to conduct tests on the neural network 1. During the neural network 1 learning, the checkpoints are read and loaded into the "TensorFlow" software library.

Figure 4A:
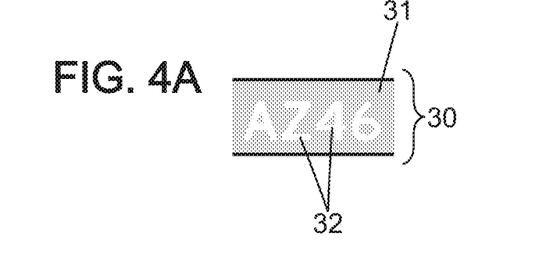
FIGS. 4A, 4B, and 4C show example images of character sequences included in the artificial database used for the neural network learning according to one embodiment of the invention.
Figure 4B:
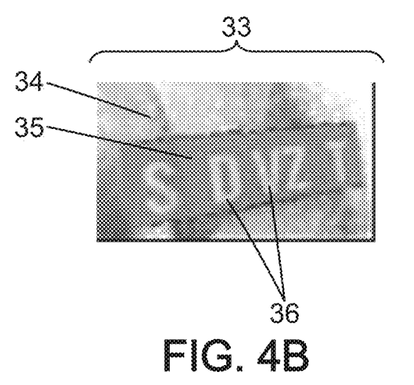
Figure 4C:
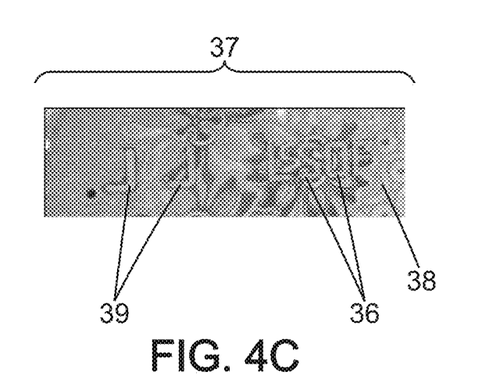

FIGS. 4A, 4B and 4C show example images of character sequences included in the artificial database used for the neural network learning according to one embodiment of the invention.

After installing the "TensorFlow" software library and implementing the general topology of the neural network 1, the operation of creating the artificial database of character sequences is then carried out which allows refining the structure and operation of the neural network, by modifying the number of layers of the neural network or the size of its convolutions.

Starting with a first sample group of only 1000 images of actual character sequences, which is usually greatly insufficient for deep neural network learning, this first dataset was used to test the neural network obtained by deep learning, using the artificial database created by random generation and geometric and colorimetric transformations.

A first portion of the artificial database contains about 400,000 black and white images of the type shown in FIG. 4A.

FIG. 4A shows an image 30 in which a straight sequence of uniformly spaced characters 32 can be extracted from a plain background 31.

A second portion of the artificial database contains about 400,000 images obtained by various advanced transformations of 400,000 black and white images of the type in FIG. 4A from the first portion of the artificial database. These advanced transformations include linear geometric transformations, color changes, random modifications to the background on which the character sequence to be recognized is found, etc.

The neural network is then tested on images representing actual character sequences to be recognized, for example images of actual automobile registration plates, corresponding here to the first reduced sample group of about 1000 actual character sequences to be recognized in 1000 video captures of actual automobile registration plates, which then can be used to modify and enrich the artificial database.

This artificial database contains many character sequences with varying spaces between characters and/or with different background colors and different background sizes, the background being what surrounds the character sequence to be recognized, particularly in its immediate vicinity, all so as to better reflect the diversity of actual automobile registration plates in order to improve the robustness of the neural network thus trained.

The obtained neural network had seven layers, and had been trained with red-green-blue images 120 pixels by 80 pixels in size. The neural network learning time lasted two days, on an artificial database combining the two portions described above in equal parts and having a total volume of approximately 800,000 artificially created character sequences.

FIG. 4B shows an image 33 in which a tilted sequence of somewhat irregularly spaced characters 36 can be extracted from a plain background 35 which is arranged in the middle of plain more distant surroundings 34.

FIG. 4C shows an image 37 in which a tilted sequence of very irregularly spaced characters 39 can be extracted from a mottled background 38.

Figure 5:
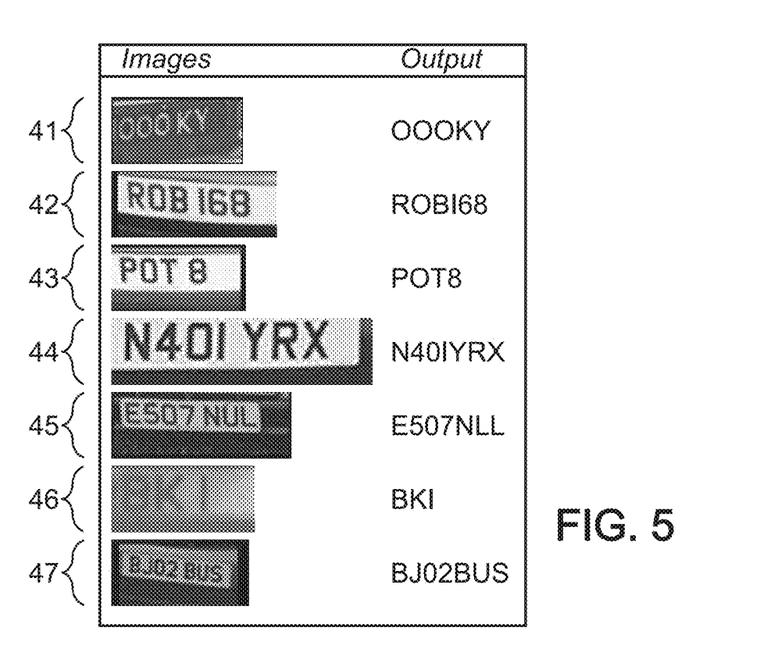
FIG. 5 represents examples of identification results, showing the effectiveness of the method for recognizing a character sequence based on the method for training a neural network according to one embodiment of the invention.

FIG. 5 illustrates examples of identification results showing the effectiveness of the method for recognizing a character sequence based on the method for training a neural network according to one embodiment of the invention.

FIG. 5 presents seven actual cases of recognizing actual registration plates, in which the high effectiveness and high robustness of the method for recognizing a character sequence based on the method for training a neural network according to one embodiment of the invention can be observed, the various registration plates being of all sizes, colors, fonts, and orientations.

On plate 41, there is no recognition error. On plate 42, there is good recognition of the letters and numbers, with only a 1 read as an I. On plate 43, there is no recognition error. On plate 44, there is good recognition of the letters and numbers, with only a 0 read as an O and a 1 read as an I. On plate 45, there is good recognition of the letters and numbers, with only a two-letter pair UL read as the pair LL. On plate 46, there is no recognition error. On plate 47, there is no recognition error.

Overall, despite some minor errors that could also be made by humans, the accuracy of the neural network trained by deep learning with the artificial database is found to be excellent, even in the case of blurred, skewed, or off-center images. The neural network thus obtained constantly determines the correct number of characters in the sequence to be recognized, meaning that it is infallible concerning the size of the character sequence to be recognized. The neural network thus obtained extracts and identifies each of the characters of the sequence to be recognized regardless of the spaces between the characters in the sequence to be recognized. The neural network thus obtained also remains very robust concerning a change in scale, because it recognizes characters of small size as well as those of large or medium size.

Of course, the present invention is not limited to the examples and to the embodiment described and represented, but is suitable for numerous variants accessible to those skilled in the art.

The invention claimed is:

1. A method for training a neural network, for recognition of a first random sequence of characters in a first image, said first random sequence containing at least one letter and at least one number, each character of said first random sequence being a letter, number, or separator, said characters being separated from each other by gaps, and without a predefined format, comprising:
- a step of creating an artificial database of a plurality of random sequences of characters in images, said plurality of random sequences including at least one first training sequence and at least one second training sequence, each random sequence of the plurality of random sequence including at least one letter and at least one number, said at least one first training sequence being generated randomly, said at least one second training sequence being derived from a transformation of said at least one first training sequence,
- a learning step that teaches the neural network to recognize the first random sequence of characters in the first image, directly on at least some of said plurality of random sequences of said artificial database, without a prior subdividing of the first random sequence into component characters,
- wherein the learning step which teaches the neural network uses a cost function to compare two probability distributions representative of the first random sequence to be recognized, and
- wherein the cost function of the first random sequence is a sum of the cost functions of each character.

2. The method for training a neural network according to claim 1, wherein the neural network is a deep neural network.

3. The method for training a neural network according to claim 2, wherein the deep neural network is a convolutional deep neural network.

4. The method for training a neural network according to claim 1, wherein, in the step of creating the artificial database of a plurality of sequences of characters in images, at least 60% of these sequences are either randomly generated sequences or are derived from transformations of randomly generated sequences.

5. The method for training a neural network according to claim 1, wherein the learning step that teaches the neural network to recognize a sequence of characters in an image is carried out directly, without prior subdividing, for at least 60% of said sequences of said artificial database.

6. The method for training a neural network according to claim 1, wherein said transformation is:
- insertion of gaps of variable size between the characters of certain sequences of the artificial database, and use of different types of backgrounds of different sizes as backdrops for the sequences of characters to be recognized.

7. The method for training a neural network according to claim 1, wherein said transformation is:
- geometric transformation types that include at least half of geometric transformation types selected from: enlargements, reductions, rotations, translations, geometric distortions, and/or other geometric deformations; and/or image processing transformation types that include at least one of image processing transformation type selected from: color changes, changes in grayscale, edge enhancements, edge smoothing, and/or other intensity and/or contrast processing.

8. The method for training a neural network according to claim 1, wherein the artificial database of sequences comprises at least 100,000 different sequences for learning.

9. The method for training a neural network according to claim 1, wherein the artificial database of sequences comprises between one-third and two-thirds randomly generated sequences, and between two-thirds and one-third sequences derived from transformations of randomly generated sequences.

10. The method for training a neural network according to claim 9, wherein some or all of the sequences contained in the artificial database and obtained by transformations of randomly generated sequences are derived from transformations of randomly generated sequences already contained in the artificial database.

11. The method for training a neural network according to claim 1, wherein:
- the artificial database comprises sequences of characters in which the characters are not standardized but instead have a variable size, a variable font, a variable color, a variable orientation, a variable brightness, variable blur level, and/or a variable signal-to-noise ratio.

12. The method for training a neural network according to claim 1, wherein the characters comprise letters and numbers.

13. The method for training a neural network according to claim 1, wherein, in the step of creating the artificial database of a plurality of sequences of characters in images, less than 10% of these sequences are actual photographed sequences.

14. The method for training a neural network according to claim 1, wherein the plurality of random sequences of characters of the artificial database respectively correspond to automobile registration plates.

15. The method for training a neural network according to claim 1, wherein a length of the plurality of random sequence of characters is comprised between one and nine.

16. The method for training a neural network according to claim 1, wherein the learning step which teaches the neural network uses, for each character of the first random sequence to be recognized, a probability table representative of said character.

17. The method for training a neural network according to claim 1, wherein said cost function is based on cross entropy.

18. The method for training a neural network according to claim 1, wherein said cost function is minimized by an ADAM optimizer.

19. The method for training a neural network according to claim 1, wherein loading of data as input to the neural network occurs via an asynchronous queue which contains files to be loaded and operations to be performed on these files.

20. The method for training a neural network according to claim 1, wherein an initialization of weights in the neural network is performed by a Xavier initializer.

21. A method for recognizing a character sequence in an image, comprising a step of recognizing a sequence of characters in an image by means of a neural network trained by a training method, for recognition of a first random sequence of characters in a first image, said first random sequence containing at least one letter and at least one number, each character of said first random sequence being a letter, number, or separator, said characters being separated from each other by gaps, and without a predefined format, the training method comprising:
- a step of creating an artificial database of a plurality of random sequences of characters in images, said plurality of random sequences including at least one first training sequence and at least one second training sequence, each random sequence of the plurality of random sequence including at least one letter and at least one number, said at least one first training sequence being generated randomly, said at least one second training sequence being derived from a transformation of said at least one first training sequence, a learning step that teaches the neural network to recognize the first random sequence of characters in the first image, directly on at least some of said plurality of random sequences of said artificial database, without a prior subdividing of the first random sequence into component characters, wherein the recognition step is preceded by a step of extracting the sequence of characters and an image background adjacent to this sequence of characters, from a remainder of the image, only said sequence of characters and said image background adjacent to this sequence of characters, excluding said remainder of the image, being provided to the neural network.

22. The method according to claim 21, wherein an image background adjacent to said sequence of characters is a single-color plain background.

23. The method according to claim 21, wherein said sequence of characters to be recognized in an image corresponds to an automobile registration plate.

24. The method according to claim 21, wherein said recognition step is carried out in real time on a video stream of images including the sequences of characters to be recognized.

* * * * *